Figure 1:
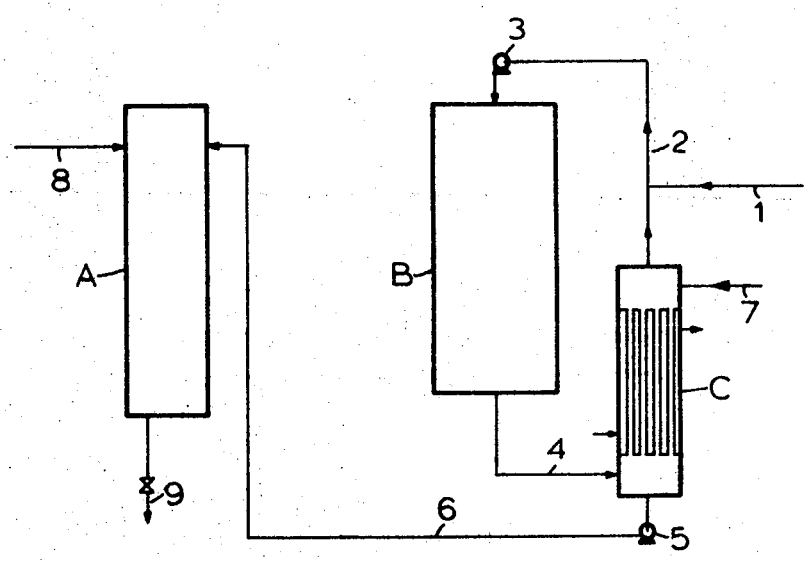

United States Patent

[11] 3,607,939

| [72] | Inventors | Petrus J. C. Kaasenbrood<br>Sittard;<br>Gerardus J. J. M. Taks, Geleen, both of<br>Netherlands |
|---|---|---|
| [21] | Appl. No. | 785,971 |
| [22] | Filed | Dec. 23, 1968 |
| [45] | Patented | Sept. 21, 1971 |
| [73] | Assignee | Stamicarbon N.V.<br>Heerlen, Netherlands |

[54] PREPARATION OF UREA IN COMBINATION WITH THE SYNTHESIS OF AMMONIA
3 Claims, 2 Drawing Figs.

[52] U.S. Cl. .................................................. 260/555 A, 23/199
[51] Int. Cl. ....................................................... C07c127/00
[50] Field of Search ........................................... 260/555 A; 23/199

[56] References Cited
UNITED STATES PATENTS

| 3,371,115 | 2/1968 | Cook et al. ................... | 260/555 |
| 3,303,215 | 2/1967 | Otsuka et al. ................ | 260/555 |

FOREIGN PATENTS

| 1,124,868 | 2/1968 | Great Britain ................ | 260/555 |
| 6,704,780 | 6/1967 | Netherlands ................. | 260/555 |

*Primary Examiner*—Leon Zitver
*Assistant Examiner*—Michael W. Glynn
*Attorney*—Cushman, Darby & Cushman ABSTRACT: A process for the manufacture of urea from ammonia and carbon dioxide is described with particular reference to procedures in handling the ammonia feed to the urea reactor whereby the volume of inert gases in said reactor is reduced without need for condensation and liquefication of the ammonia synthesis gas. The technique described involves absorbing the ammonia from the ammonia synthesis gas mixture (containing ammonia, hydrogen and nitrogen) in water, a dilute aqueous solution of urea, or a dilute aqueous solution of ammonia and carbon dioxide at a relatively high pressure (250 atm. or more) and then delivering the absorbed ammonia solution to the urea plant—this technique being practiced so that only a relatively small amount of additional water (over and above that autogenously formed in the urea reaction itself) is introduced into the urea reactor.

PREPARATION OF UREA IN COMBINATION WITH THE SYNTHESIS OF AMMONIA

This invention relates to an improved process for the preparation of urea which is incorporated in an ammonia-synthesis process.

As early as 1924, Casale described a process of this type consisting in that the gas mixture from the ammonia-synthesis unit typically containing about 20 percent by volume of $NH_3$, the remainder being nonconverted $H_2$ and $N_2$, under the prevailing temperature and pressure, is introduced into a urea-synthesis zone together with carbon dioxide to form the urea-synthesis solution or melt. Thereafter, the remaining gas mixture with addition of fresh nitrogen-hydrogen mixture is fed back to the ammonia-synthesis unit.

The said process has the disadvantage that a large volume of inert gases is present in the urea-synthesis zone, as a result of which a larger reactor volume is required per ton of urea produced. Moreover, a higher total synthesis pressure is required in order to attain a sufficiently high reaction temperature, the magnitude of which is dependent upon the partial pressure of the $NH_3$ and $CO_2$ reaction components in the gas mixture entering the urea-synthesis zone.

Owing to the above-mentioned disadvantages, this process is not very attractive from a practical and economical point of view. While it is true that it is possible to lower the inert gas volume introduced into the urea-synthesis zone by first liquefying the ammonia gas and thereby separating out the hydrogen and nitrogen content thereof, such a technique not only results in heat losses in the cooling-out of $NH_3$ from the gases from the ammonia-synthesis unit, input calories being carried off by the cooling water employed. Further, energy is required for the refrigerating machinery required to lower the temperature of the gases to about $-10°$ to $-20°$ C. for effecting such liquefaction.

According to the present invention, it has now been found that these disadvantages can be overcome by absorbing the $NH_3$ from the $NH_3$, $H_2$ and $N_2$ gas mixture from the ammonia-synthesis unit in a countercurrent flow of itself, or of a diluted, aqueous solution of urea, or of a diluted, aqueous solution of ammonia and carbon dioxide, and subsequently feeding the resulting ammoniacal solution to the urea-synthesis zone. Such a process has not previously been employed, because, perhaps, theoretically, the process would be disadvantageous because of the additional amount of water introduced into the urea-synthesis zone, over and above that formed merely as a result of which the equilibrium of the reaction:

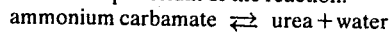

ammonium carbamate $\rightleftarrows$ urea + water

Additional water would tend to drive this equilibrium to the left which would be unfavorable as far as the formation of urea is concerned. However, it has further been found that if a sufficiently high pressure, e.g., of 250 atmospheres or over, is used in the absorption treatment, the amount of water required for effecting the $NH_3$-absorption can be made so small that the advantages of the process far outweigh the theoretical disadvantages.

The diluted aqueous solutions of urea, or of ammonia and carbon dioxide, which can be used for absorbing the $NH_3$, are solutions which are normally obtained in a urea plant in evaporation processes by condensation of the vapor and contain only a few percent by weight of solid substances.

The principle underlying the process of this invention will now be elucidated with reference to FIG. 1 of the attached drawings, which shows a urea-synthesis reactor A, an ammonia-synthesis reactor B and an absorption column C, in diagrammatic outline. The absorption column is of the tubular type, in which the absorbent flows down within a bunch of pipes, while it is cooled by a coolant supplied around the tubes. The coolants used are preferably liquids or gases available from elsewhere in the plant which, for various other reasons have to be preheated, such as boilerfeed water, urea solutions to be evaporated, or gasoline which is eventually converted in a cracking furnace.

Fresh ammonia-synthesis gas which is at the synthesis pressure, is supplied to the ammonia-synthesis column via conduit 1, conduit 2 and bypass pump 3. The gases exiting from the same ammonia-synthesis reactor column B, which contain 15 to 20 percent by volume of $NH_3$, and from which liquid ammonia can be condensed by a simple cooling treatment with cooling water, and subsequently separated off, are passed via conduit 4 to absorption column C, where the gas mixture is brought into contact with a countercurrent flow of the absorbent supplied through conduit 7, the said absorbent taking up the $NH_3$. The synthesis gas thus freed from $NH_3$ then flows via conduit 2 and pump 3, back again to ammonia-synthesis column B together with freshly supplied synthesis gas. The ammonia solution thus obtained in column C, which contains, e.g., 90 percent by weight of $NH_3$, is supplied to urea-synthesis reactor A via pump 5 and conduit 6. The urea-synthesis reactor is also supplied with $CO_2$, delivered via conduit 8, which $CO_2$ has previously been compressed to the synthesis pressure. The urea-synthesis solution or melt formed in the reactor A is discharged via conduit 9 for further treatment.

As has been described elsewhere, a nitrogen-hydrogen mixture containing carbon dioxide may be used in the present integrated process for the preparation of urea and ammonia in such a way that first the carbon dioxide is utilized in the urea-synthesis reactor and subsequently the gases discharged from the said reactor are fed to the ammonia-synthesis reactor. A process of this type is schematically presented in FIG. 2. The reference letters and numbers employed in FIG. 1 having been used in FIG. 2 for corresponding components of the process unit.

Figure 2:
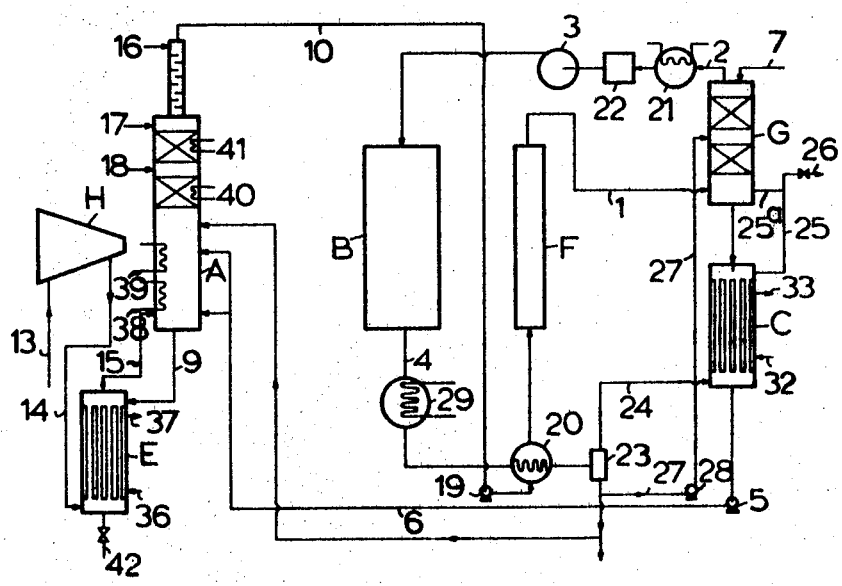

In the process according to FIG. 2, synthesis gas supplied via conduit 13, e.g., a mixture of $H_2$, $N_2$ and $CO_2$ obtained by conversion of methane, is compressed to the synthesis pressure by compressor H and subsequently passed to urea-synthesis reactor A via conduit 14, stripping column E and conduit 15. In reactor A, the $CO_2$ present in the gas flow is converted into ammonium carbamate and urea, combining with the concentrated ammonia solution supplied through conduit 6. To remove the nonreacted $NH_3$, the gas components are washed with water supplied through conduit 16 and ammonium carbamate solutions supplied through conduits 17 and 18, which carbamate solutions have been obtained in turn from the processing and evaporation of the urea-synthesis solution.

The ammonia-synthesis gas thus obtained, which has been virtually completely freed from $CO_2$ and $NH_3$, is passed via conduit 10, pump 19 and heat exchanger 20 (wherein the gas flow is heated to, e.g., $130°$ C. by the hot gas flow discharged from the ammonia-synthesis reactor) to CO-convertor F. The CO present as a contaminent in the synthesis gas is oxidized in converter F to carbon dioxide. The synthesis gas then flows via conduit 1 to washing column G, where the $CO_2$ formed is removed with the aid of $NH_3$ supplied via conduit 27, and which is subsequently delivered, via conduit 2 and bypass pump 3, into ammonia-synthesis reactor B, after it has previously been freed from the last traces of water, $NH_3$ and carbon dioxide by means of condenser 21 and molecular sieves 22.

The $NH_3$-containing gas flow discharged from the ammonia-synthesis column via conduit 4, and which is now at a temperature of about $430°$ C. is passed through steam generator 29, in which the gas temperature is lowered to about $160°$ C., and through heat exchanger 20, wherein the same temperature is further decreased to about $80°$ C. and part of the $NH_3$ is condensed. The condensed ammonia is then separated from the gas flow in gas-liquid separator 23 and, if so desired, partly supplied to washing column G via conduit 27 and pump 28.

The remaining portion thereof is discharged to the urea-synthesis autoclave or, if so desired, carried off as liquid ammonia product and delivered through conduit 24 to absorption column C where it is brought into contact with an absorbent supplied via conduit 7, and which has been formed by water or an aqueous solution, which has first passed through washing column G to serve as washing liquid and subsequently flowed into the tops of the tubes of absorption column C. In the said pipes, the $NH_3$ contained in the gas mixture supplied via conduit 24 is absorbed by the downward, countercurrent absorbent flow. The absorption heat released in the said treatment heats the coolant supplied through conduit 32 and flowing around the above-mentioned tubes, which leaves absorption column C via conduit 33. The gas which has now been largely freed from $NH_3$ is fed via conduits 25 and 25a into the base of washing column G, in which the $NH_3$ still left is removed from it, and subsequently returned to ammonia-synthesis reactor B via conduit 2 and bypass pump 3.

To prevent inert gases, such as argon, from accumulating in the circulated gas flowing through ammonia-synthesis reactor B, part of the gas flow is vented in the customary way via blow-down pipe 26.

The concentrated ammonia solution thus obtained is fed into the base of the urea-synthesis reactor via pump 5 and conduit 6, and the first ammonia reacts with carbon dioxide to yield ammonium carbamate. Subsequently urea is formed in the reactor with simultaneous formation of water. The urea-synthesis solution formed in urea-synthesis reactor A is fed via conduit 9 into the top of stripping column E to be brought into contact with a countercurrent flow of synthesis gas supplied via conduit 14, as a result of which, as is known in the art, a large portion, e.g., 80 to 90 percent of the ammonium carbamate present in the urea-synthesis solution is removed therefrom in the form of $NH_3$ and $CO_2$. The required heat is supplied in the form of steam via conduit 36, the condensed steam being discharged via conduit 37. The synthesis gas containing $NH_3$ and $CO_2$ flows into the base of urea-synthesis column A via conduit 15. The heat produced in the said column is, mostly with simultaneous formation of steam, carried off by means of cooling spirals 38, 39, 40 and 41, which are at different temperature levels.

The urea solution thus produced is discharged from the base of the stripping column via conduit 42 and, after the pressure has been reduced, this solution is, in the customary way, further freed from ammonium carbamate which has not been converted into urea, and it is subsequently evaporated to a urea melt.

It will be appreciated that this invention will be practiced under conditions other than those specifically set forth in the foregoing description. For instance, the ammonia gas feed stream from the ammonia-synthesis unit may be delivered to the countercurrent absorption step under pressure within the range of 200 to 500 atm., and similarly the aqueous ammonia solution obtained from the absorbing step may be delivered to the urea synthesis unit under pressures in the range of 100 to 500 atm. The temperature of the absorption step will, as mentioned above, typically be below that of the ammonia-gas flow discharged from the ammonia-synthesis unit and will be conveniently in the range of about 40° to 150 °C. In practice according to this invention, the aqueous ammonia solution obtained from the absorption step, and which is then delivered to the urea-synthesis unit, will have a concentration of about 50 to 90 mol-percent ammonia whereby the ammonia feed required for the urea synthesis reaction may be fed to the reactor with the introduction of only relatively small amounts of water, thereby providing an overall practical and economic advantage to the process as described hereinabove.

We claim:

1. In a process for the preparation of urea by reacting ammonia and carbon dioxide at elevated temperatures and pressures in combination with an ammonia synthesis process wherein the ammonia formed in said ammonia synthesis unit is supplied to the urea synthesis unit for reaction with carbon dioxide also supplied thereto, the improvement consisting essentially in lowering the inert gas content of the ammonia stream obtained from the ammonia synthesis unit by the combination of steps of:
    1. delivering the gas stream from the ammonia synthesis unit, containing ammonia, hydrogen and nitrogen gases, under the synthesis pressure into a countercurrent flow of
        (a) water,
        b. an aqueous solution of urea, or (c) an aqueous solution ammonia and carbon dioxide, and
    2. absorbing the ammonia contained in said gas stream into said water or aqueous solution while under said synthesis pressure, and separating an ammonia-free gas mixture containing hydrogen and nitrogen from this aqueous ammonia-containing solution, and
    3. delivering the said thus-obtained aqueous ammonia solution to said urea-synthesis reactor as the ammonia freed, and
    4. recycling the ammonia-freed gas mixture from the said absorbing operation back to the ammonia synthesis reactor.

2. The process of claim 1 wherein the absorption of said ammonia in water or the aqueous solution is conducted in a pressure between about 200 to 500 atm. and a temperature between about 40° to 150° C.

3. The process of claim 1 wherein said aqueous ammonia solution has a concentration of from about 50 to 95 mol-percent ammonia.

UNITED STATES PATENT OFFICE
CERTIFICATE OF CORRECTION

Patent No. 3,607,939         Dated September 21, 1971

Inventor(s) Petrus J. C. Kaasenbrood et al.

It is certified that error appears in the above-identified patent and that said Letters Patent are hereby corrected as shown below:

On the cover sheet insert -- [32] Priority Dec. 21, 1967 [33] Netherlands    [31] 6,717,525    --.

Signed and sealed this 10th day of October 1972.

(SEAL)
Attest:

EDWARD M. FLETCHER, JR.
Attesting Officer

ROBERT GOTTSCHALK
Commissioner of Patents

UNITED STATES PATENT OFFICE
CERTIFICATE OF CORRECTION

Patent No. 3,607,939                     Dated September 21, 1971

Inventor(s)    Petrus J. C. Kaasenbrood et al.

It is certified that error appears in the above-identified patent and that said Letters Patent are hereby corrected as shown below:

On the cover sheet, insert -- [30] Foreign Priority Data Netherlands December 21, 1967   6,717,525 --.
Column 4, line 7, "90" should read -- 95 --.

Signed and sealed this 22nd day of May 1973.

(SEAL)
Attest:

EDWARD M. FLETCHER, JR.
Attesting Officer

ROBERT GOTTSCHALK
Commissioner of Patents